Dec. 17, 1968   D. L. PEZZUTI   3,416,682
COMBINATION LIFT TRUCK, HAND TRUCK AND FLOOR DOLLY
Filed Oct. 3, 1966

INVENTOR.
DOMINICK L. PEZZUTI
BY
ATTORNEYS

United States Patent Office 3,416,682
Patented Dec. 17, 1968

1

3,416,682
COMBINATION LIFT TRUCK, HAND TRUCK AND
FLOOR DOLLY
Dominick L. Pezzuti, 320 Robble Ave.,
Endicott, N.Y. 13761
Filed Oct. 3, 1966, Ser. No. 583,711
6 Claims. (Cl. 214—370)

ABSTRACT OF THE DISCLOSURE

The improvement in a versatile, multipurpose combination lift truck, hand truck, and floor dolly including a frame, a support or lift plate and an upper set of casters characterized in that a lower set of swivel mounted casters are positioned such that the casters (1) extend beyond the lower end of the frame for use of the truck in an upright position and also (2) extend beyond the bottom of the truck for cooperation with the upper set of casters for use of the truck in a horizontal position. Locking means are provided for locking the lower set of casters in either of two positions; the locking means can also be disengaged to allow free 360° swivel action of the lower set of casters.

---

This invention relates to handtrucks and more particularly to an improved multipurpose handtruck. Reference is made to Patent Re. 25,691 entitled, "Handtruck," issued Dec. 1, 1964, upon which handtruck the structure of this invention is an improvement.

Numerous types of handtrucks have been heretofore employed for lifting and moving relatively heavy items such as desks, bookcases, refrigerators, stoves, and many other items. Most of these trucks have only a single purpose, i.e., to lift the load so that it and the truck extend at an angle. The load is supported by two or more wheels located at the front end of the truck. Such trucks have insufficient flexibility and cannot be used in many of several different situations.

The truck of the above mentioned patent is a multi-type purpose of the type generally set forth in this application. The purpose of the structure of this application is to improve upon and increase the sturdiness of the truck of said patent and simplify the arrangement of parts, particularly the casters thereof.

An object of this invention is to provide a handtruck of improved construction.

Another object of this invention is to provide an improved handtruck of simplified construction which is capable of lifting heavy objects and may be produced at a lesser cost.

More specifically my invention contemplates the provision of a handtruck of the type shown in the above referred to reissue patent in which one set of casters adjacent to the front of the frame are swivelled so that upon swivelling and locking them in one of two positions they may perform a multiplicity of functions to adapt the truck to various uses.

Other objects and advantages of this invention will be particularly set forth in the claims and will be apparent from the following description, when taken in connection with the accompanying drawings, in which:

2

Figures 2, 3:
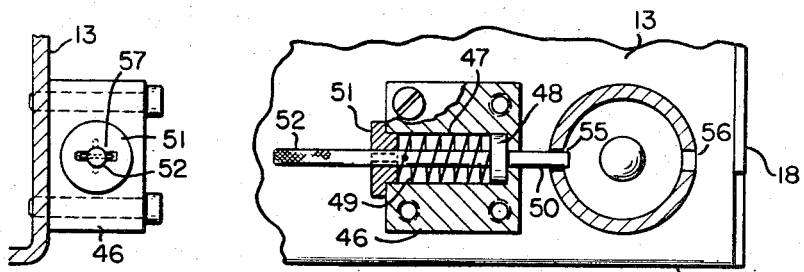
FIGURE 2 is a sectional view taken substantially on the line 2—2 of FIG. 1 in the direction indicated by the arrows and showing the means for locking the forward set of casters in either of the two potential positions shown in FIG. 1.
Figure 4:
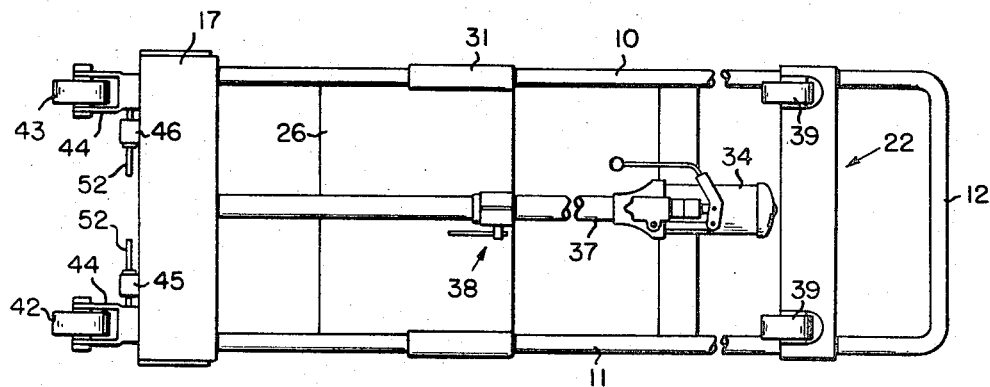

FIGURE 3 is an end view of the locking means looking from left to right of FIG. 2; and FIGURE 4 is a bottom plan view of the truck of my invention.

Figure 1:
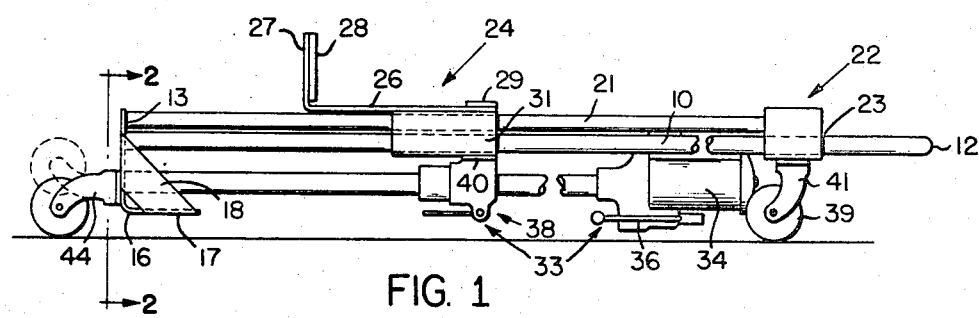
FIGURE 1 is a side elevation of the utility truck of my invention with one set of casters of the truck shown in solid and dotted line positions the two casters positions which these casters may occupy.

Referring now to the drawings and particularly FIG. 4 thereof which shows the underside of the truck, there is shown a truck frame which may be made of suitable tubular material. The frame comprises two legs or sides 10 and 11 and a bent and re-bent portion to form a handle 12. Thus the tubular part of the frame is in the form of a U. Welded to one end of the ends of the side tubular members 10 and 11 defining the frame, is a cross member or end plate 13 which is positioned to complete the frame as shown (FIG. 1). The plate 13 is bent at 16 to provide a bottom plate. Strengthening gusset plates 18 are welded to the plate 13 as shown in the side view of FIG. 1.

Welded to the end plate 13 for strengthening purposes are a pair of tubular members 21 which lie above the tubular members 10 and 11. A cross member generally indicated by the numeral 22 has downwardly turned sides. The ends of the tubular members 21 are welded to the cross member 22 and tubular members 10 and 11 there are welded to cross member 22 and 23.

Extending across the frame is a slide generally indicated by the numeral 24. The slide comprises a plate 26 (FIG. 4) and a lift member 27 which is bent upward from the plate 26 and has a rubber padded face 28. A second rubber pad 29 is applied to the plate 26 and the load in normal use of the handtruck is carried on the pads 28 and 29.

Depending below the plate 26 on each side thereof and secured thereto as by welding, are a pair of tubular parts 31 which ride on the tubular members 10 and 11 and on the upper tubular members 21.

Carried on the underside of the frame is a lifting mechanism, generally indicated by the numeral 33. The lifting mechanism includes a cylinder 34, a handpump generally indicated by the numeral 36, a tubular member 37, and a locking member generally indicated by the numeral 38. When the locking member is released the locking member 38 may be moved along the tubular member 37. The locking member 38 is welded at 40 to the carriage or lifting member 24. Upon actuation of the pump, lifting member 24 may be moved lengthwise of the truck frame either with or without a load. The particular lifting mechanism constitutes no part of my present invention but it may in general be similar to the lifting jack of a hydraulic automobile jack. The lifting mechanism may be similar to that shown in the above mentioned Reissue Patent.

Secured in sockets provided in the cross member 22 are a pair of casters 39 mounted on the usual axles. The forked members 41 of the casters are connected to caster pins (not shown), the pins being arranged so that the casters may swivel about the vertical axes of the pins.

Mounted on the forward end of the truck are a pair of swivel casters 42 and 43 which are mounted on the usual axles. The axels' ends are connected by forked members 44 and the swivel pins thereof are recessed in sockets (not shown) formed in the end or cross plate 13. The swivel casters 42 and 43 are swivelled so that they may be positioned as shown in solid lines in FIG. 1 or as shown in dotted lines in the same view. The pivot pins are located in the end plate a distance above the bottom thereof such that when swivelled to the solid line position, these casters are in horizontal alignment with the casters 39.

In either of the above described two positions, the casters 42 and 43 may be locked. The locking mechanism is shown in FIGS. 2 and 3 and comprises brackets 45 and 46 each having a cylinder 47 formed therein. A piston 48 is pressed by a spring 49. The spring is seated on the piston 48 and a closure piece 51 of the cylinder. A rod 52 secured to the piston 48 projects through an opening in the closure piece and has a finger piece on its end. The other end 50 of the rod is normally pressed to the right as viewed in FIG. 2. A pin 57 connected to rod 52 is used to hold the rod in a disengaging position by pulling the rod to the left as viewed in FIG. 2 and then rotating it 90° such that the pin 57 will occupy the position shown by the broken lines in FIG. 3. When the rod is so restrained the other end 50 can not engage the caster bracket whereby the casters 39 are free to rotate 360°. The specific locking means provided is particularly efficient but other forms of locking means may be provided as will be evident.

Each of the caster brackets or supports for the forked ends 44 has a pair of openings 55 and 56 as shown in FIG. 2. The caster openings or slots are adapted to receive the plunger or rod 52. When the casters as shown in FIG. 1 are in the solid line position the plunger 52 is in one of the openings, as for example, the caster opening 55. When the caster is rotated to the dotted line position indicated in FIG. 1 and the plunger 52 is in the caster bracket opening 56, the caster is held in the dotted line position shown in FIG. 1. Thus, the caster may be used in either of the two positions and locked in each of said positions.

When both casters are in the lowermost position, that is so that the lower edges are below the carriage frame and below the lowersmost point of the appurtenances of the truck, the truck is adapted to receive a load to be pushed horizontally. That is, the load is applied to the frame with the load bearing slide 24 in its lowermost position, in which position the largest expanse of the truck is available for loading. The device may then be used as a dolly. When used as a dolly the casters 42 and 43 should be locked in the down position so that the frame clears the floor.

If it is desired to pick up the load and transport it on the floor casters 42 and 43, so that the frame extends angularly upward with respect to the floor, a lifting force may be applied on the handle so that the load is carried by the truck frame and patricularly on the rubber pad 28. When used in this position the casters 42 and 43 may be either up or down and are preferably locked but could be used unlocked.

At times it is necessary to move extremely heavy loads such as large packing cases. It is possible to place two trucks in juxtaposition separated by the packing case, then by raising the frames of both trucks to a vertical position and lowering the slide 24 so that they rest substantially on the floor, the two trucks may be used conjointly to lift and transport the large packing case. This is done by lifting the casters 42 and 43 to the dotted line position. In that position the casters engage the floor. After the rubber pads 28 are under the packing case, the lifting mechanism of both trucks may be actuated so as to lift the packing case off the floor. Then the case may be transported on the two trucks by the casters 42 and 43 of both trucks with the packing case standing between the trucks. This is done with the casters 42 and 43 of both trucks unlocked so that they may swivel through 360° so that the load may be steered and positioned. If desired, the casters 42 and 43 of one truck may be locked for better steering control.

While I have shown and described the preferred form of mechanism of my invention, it will be apparent that various modifications and changes may be made therein particularly in the form and relation of parts, without departing from the spirit of my invention as set forth in the appended claims.

I claim:

1. In a multipurpose moving device having an upper end and a lower end and a front side and an underside and including a frame, a support plate mounted on the front side of said device, and a plurality of upper casters mounted adjacent said upper end of said device, said casters having a swivel axis extending normal to the plane of the frame and having at least a portion thereof extending beyond the underside of said device, the improvement comprising:

a plurality of lower casters mounted adjacent the lower end of said device, said lower casters having a swivel axis extending parallel to the plane of the frame, said lower casters having at least a portion thereof extending beyond the lower end of said device for supporting said device in an upright position such that said lower casters make said device useful as a hand truck and in an upright position as a lift truck, said lower casters having a first swivel position in which at least a portion thereof extends below the underside of the device for supporting said device, in cooperation with said upper casters, in a horizontal position such that said lower casters make said device useful as a floor dolly, and means for locking said lower casters in said first swivel position.

2. The apparatus according to claim 1 in which said locking means includes a spring pressed plunger mounted adjacent each of said lower casters, each of said lower casters including a plunger receiving recess located such that when the plunger is received in the recess said caster is positioned in said first swivel position.

3. The apparatus according to claim 2 including holding means for maintaining each of said plungers away from its corresponding caster such that the corresponding caster is adapted to rotate freely 360°.

4. The apparatus according to claim 1 wherein said support plate is a lift plate and including means for raising and lowering said lift plate.

5. The apparatus according to claim 1 wherein said lower casters when in said first swivel position define with said upper casters, a plane of contact which is parallel to the plane of the frame.

6. In a multipurpose moving device having an upper end and a lower end and a front side and an underside and including a frame, a support plate mounted on the front side of said device, and a plurality of upper casters mounted adjacent said upper end of said device, said casters having a swivel axis extending normal to the plane of the frame and having at least a portion thereof extending beyond the underside of said device, the improvement comprising:

a plurality of lower casters mounted adjacent the lower end of said device, each of said lower casters having a swivel axis which is parallel to that of each other lower caster, which swivel axis is parallel to one only of the plane of the frame and a plane normal thereto, said lower casters having at least a portion thereof extending beyond the lower end of said device for supporting said device in an upright position such that said lower casters make said device useful as a hand truck and in an upright position as a lift truck, said lower casters having at least a portion thereof extending beyond the underside of said device and defining a support plane, with said upper casters, which is substantially parallel to the plane of the frame for making said device useful as a floor dolly, and means for locking said lower casters in that swivel position in which the force of the load applied to the frame is normal to the swivel axis.

References Cited

UNITED STATES PATENTS

| | | | |
|---|---|---|---|
| 2,251,567 | 8/1941 | Gould et al. | 16—35 |
| 2,505,852 | 2/1952 | Budnick et al. | 16—35 |
| 3,003,654 | 12/1964 | Pelto | 214—370 |

ALBERT J. MAKAY, Primary Examiner.

U.S. Cl. X.R.

280—47.18; 16—35